(12) United States Patent
Kelley

(10) Patent No.: US 10,423,974 B2
(45) Date of Patent: Sep. 24, 2019

(54) PROCESS FOR PROVIDING PHYSICAL GOLD-BACK REBATES ON PURCHASES BY A SECURED GOLD-BACK SAVINGS SYSTEM

(71) Applicant: Steven Michael Kelley, Saugus, CA (US)

(72) Inventor: Steven Michael Kelley, Saugus, CA (US)

(*) Notice: Subject to any disclaimer, the term of this patent is extended or adjusted under 35 U.S.C. 154(b) by 626 days.

(21) Appl. No.: 14/922,578

(22) Filed: Oct. 26, 2015

(65) Prior Publication Data

US 2016/0117710 A1    Apr. 28, 2016

Related U.S. Application Data

(60) Provisional application No. 62/069,002, filed on Oct. 27, 2014.

(51) Int. Cl.
    *G06Q 30/02*    (2012.01)
(52) U.S. Cl.
    CPC ..... *G06Q 30/0215* (2013.01); *G06Q 30/0238* (2013.01); *G06Q 30/0222* (2013.01); *G06Q 30/0234* (2013.01)
(58) Field of Classification Search
    CPC .................................................... G06Q 30/02
    See application file for complete search history.

(56) References Cited

U.S. PATENT DOCUMENTS

| 5,787,404 | A | 7/1998 | Fernandez-Holmann | |
| 8,015,089 | B1* | 9/2011 | Baya'a | G06Q 20/10 705/35 |
| 2001/0020231 | A1* | 9/2001 | Perri, III | G06Q 30/02 705/14.16 |
| 2002/0052778 | A1* | 5/2002 | Murphy | G06Q 30/02 705/14.36 |
| 2002/0169662 | A1* | 11/2002 | Claiborne | G06Q 30/02 705/14.11 |
| 2003/0144907 | A1* | 7/2003 | Cohen, Jr. | G06Q 30/02 705/14.13 |
| 2003/0191708 | A1* | 10/2003 | Turk | G06Q 20/02 705/39 |
| 2006/0293988 | A1* | 12/2006 | Sagaspe | G06Q 30/02 705/35 |
| 2007/0057036 | A1* | 3/2007 | Santa Cruz | G06Q 20/10 235/380 |
| 2007/0265919 | A1* | 11/2007 | Jarjour | G06Q 30/02 705/14.18 |
| 2009/0164303 | A1* | 6/2009 | Doyle | G06Q 30/02 705/14.49 |
| 2009/0287570 | A1 | 11/2009 | Adamousky et al. | |

(Continued)

*Primary Examiner* — Vincent M Cao
(74) *Attorney, Agent, or Firm* — Plager Schack LLP; Mark H. Plager; Stephen Hallberg

(57) ABSTRACT

A secured SSL protected private membership gold-back savings club system and a process for providing physical gold-back rebates on purchases are disclosed. The system and process provide physical gold-back rebates on e-commerce and point of sale (POS) purchases. The physical gold-back rebates on purchases are provided through a secured SSL protected private membership savings club platform. The private membership savings club platform is based on specific secured strategic synergy transaction network systems, applications, and APIs.

10 Claims, 4 Drawing Sheets

(56) References Cited

U.S. PATENT DOCUMENTS

| | | | |
|---|---|---|---|
| 2011/0131108 A1* | 6/2011 | Doxey | G06Q 30/02 705/26.1 |
| 2013/0191274 A1* | 7/2013 | Karri | G06Q 20/065 705/39 |
| 2015/0046246 A1 | 2/2015 | Men et al. | |

* cited by examiner

US 10,423,974 B2

PROCESS FOR PROVIDING PHYSICAL GOLD-BACK REBATES ON PURCHASES BY A SECURED GOLD-BACK SAVINGS SYSTEM

CLAIM OF BENEFIT TO PRIOR APPLICATION

This application claims benefit to U.S. Provisional Patent Application 62/069,002, entitled "Buyer's Club Membership service, where all purchases through our auspices (i.e. Techniques, Technologies, & Tools) produce "Gold-Back" rebates, and secured value savings in a physical allocated gold-backed residual rebate rewards reserve account for "real-money riches" (real values) accumulation," filed Oct. 27, 2014. The U.S. Provisional Patent Application 62/069,002 is incorporated herein by reference.

BACKGROUND

Embodiments of the invention described in this specification relate to a process for providing physical gold-back rebates on purchases by a secured gold-back savings system.

Loyalty programs, rebate clubs, and all other forms of loyalty programs rebates and rewards, including fiat cash-back (government-issued bonds or IOU's) go to zero value eventually, are not universal or ubiquitous, through time and space as pure gold is. Also, fractional reserve traditional banking of fiat currency now involves low (i.e., below true inflation rates) or even negative interest rates, and even "bail-ins" of depositor monies usurpation as unsecured creditors upon bank failures. Rebates from purchases are also deemed non-taxable by the IRS.

However, there exists a dilemma between Keynesian (print & spend) and Austrian (mint & save) economic camps: that is, "How do I spend for what I want and need now, and still save for the future too?" Since all other forms of rebates or rewards lose value, go to zero, are not universally or ubiquitously accepted at face (weight/content) value, this problem is exacerbated.

On the other hand, gold is a precious metal that counters the typical value-losing rewards that currently exist. Space and time are not barriers or causes of loss to gold's eternal and universal value recognition. Gold's value has been notable throughout human history and geo-political experience. In particular, pure physical gold has at least a 6000 year history of retained value, is universal and ubiquitous for recognition of its value, and gains value as all other currencies and rewards lose value. Gold also gains for inflation in the face of other inherent losses of all other rewards/rebates/currencies. Gold has an accountable track record of compounded annual growth, with rates that are calculated by most metrics to be well over 8% over the last 44 years.

Plus, all rebates on purchases are deemed non-taxable by the IRS, so rebates provide a tax savings where income and capital gains are typically taxed. Unfortunately, none of the existing loyalty and/or rebate methods/systems use gold.

Therefore, what is needed is a way to use gold to in a way that rebate or value-back propositions are universally accepted, ubiquitous, and able to retain or gain value over time.

BRIEF DESCRIPTION

Some embodiments of the invention include a novel secured gold-back savings system and process for providing physical gold-back rebates on purchases. The purchases include e-commerce purchases and point of sale (POS) purchases. In some embodiments, the process for providing physical gold-back rebates on purchases includes issuing physical gold-back rebates to a customer based on purchases.

In some embodiments, the process is performed through the secured gold-back savings system, which includes a secured SSL protected private membership savings club platform. In some embodiments, the physical gold-back rebates on purchases are provided through the secured SSL protected private membership savings club platform. In some embodiments, the private membership savings club platform is based on specific secured strategic synergy transaction network systems, applications, and APIs.

BRIEF DESCRIPTION OF THE DRAWINGS

Having described the invention in general terms, reference is now made to the accompanying drawings, which are not necessarily drawn to scale, and wherein.

DETAILED DESCRIPTION

As stated above, loyalty programs, rebate clubs, and all other forms of loyalty programs rebates and rewards, including fiat cash-back (government-issued bonds or IOU's) go to zero value eventually, are not universal or ubiquitous, through time and space as pure gold is.

Embodiments of the invention described in this specification solve such problems by a secured gold-back savings system and process for providing physical gold-back rebates on purchases. The purchases include e-commerce purchases and point of sale (POS) purchases. In some embodiments, the process for providing physical gold-back rebates on purchases includes issuing physical gold-back rebates to a customer based on purchases.

Figure 1:
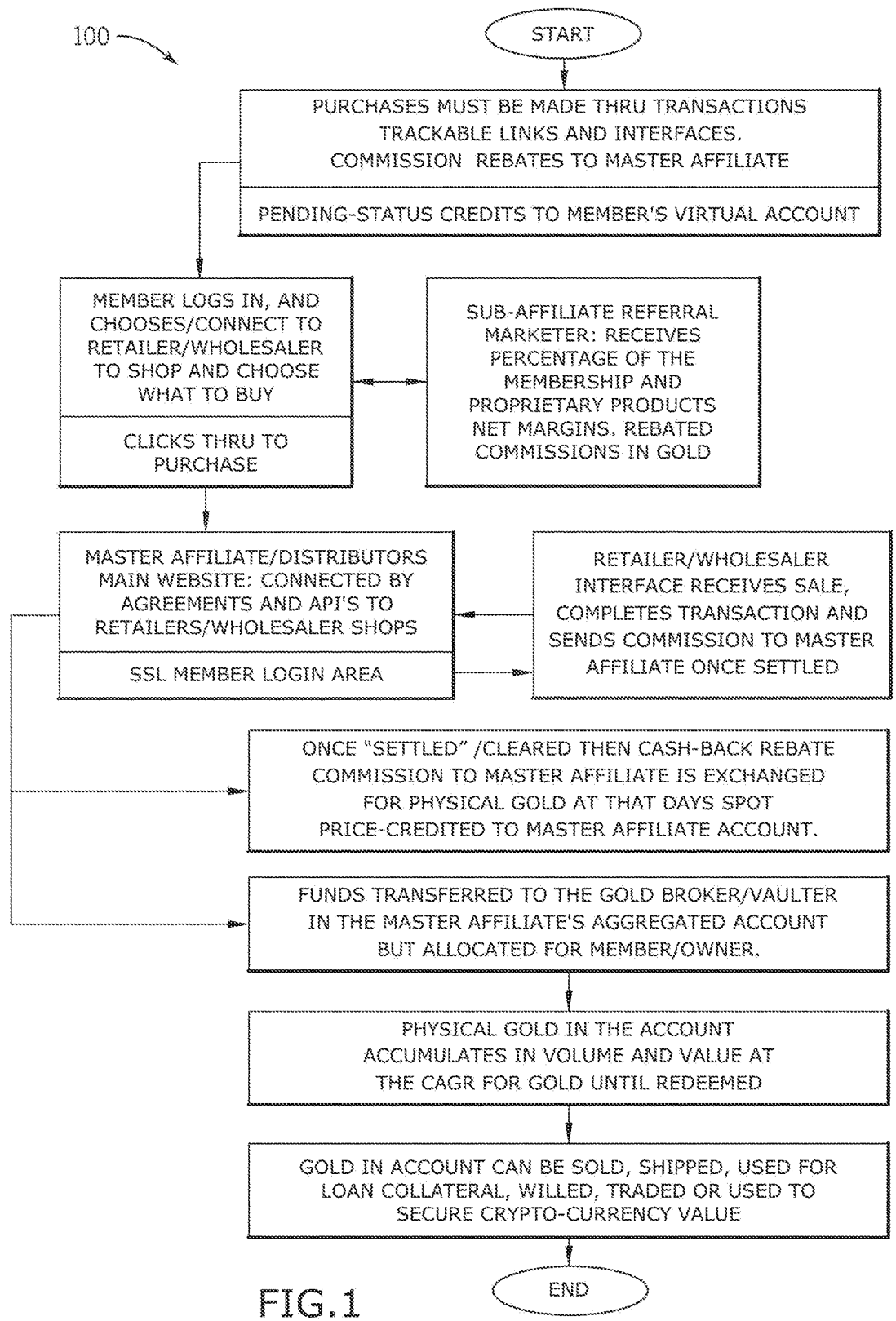
FIG. 1 shows a process for providing physical gold-back rebates on purchases through a secured SSL protected private membership savings club platform in some embodiments.

By way of example, FIG. 1 illustrates a process 100 for providing physical gold-back rebates on purchases through a secured SSL protected private membership savings club platform. The process 100 may be comprised of the steps illustrated in this figure, to allow people who purchase ordinary items or services to sign up as registered members and open a "virtual account" for tracking purchases through auspices of the secured SSL protected private membership savings club platform (e.g., e-commerce purchases made by way of trackable links to a purchase site). Members may purchase anything offered for sale, including products or services for everyday needs and wants, or luxury purchases or other purchases of all types of products or services. A primary entity that establishes the secured SSL protected private membership savings club platform involves one or more affiliates, distributors, or VAR (value-added reseller) for commission rebates from end retailers, wholesalers, or service providers. This is trackable for status and source through a variety of application programming interfaces (APIs). Once settled, this commission is credited to the individual purchasers virtual account. Then this fiat money (such as the U.S. Dollar ("USD")), credit is exchanged for physical gold through a precious metals broker and private vault. These are non-bank private, insured and accounted, vaults for storage, so no bank-failure bail-ins either, and no inflation tax like fiat cash has. Thus, the private vault is insured, accounted, allocated and held for the account holder in tax-free rebates on purchases funded accounts. It now is fully owned by purchaser, tax-free and unencumbered asset, unlike depositors in cash-account banks. It can be spent, shipped, saved, willed, gifted, or used in other ways (e.g., collateral for loans, etc.).

In some embodiments, the process is performed through the secured gold-back savings system, which includes a secured SSL protected private membership savings club platform. In this way, the physical gold-back rebates are provided through the secured SSL protected private membership savings club platform. Also, the private membership savings club platform is based on specific secured strategic synergy transaction network systems, applications, and APIs.

Figure 2A:
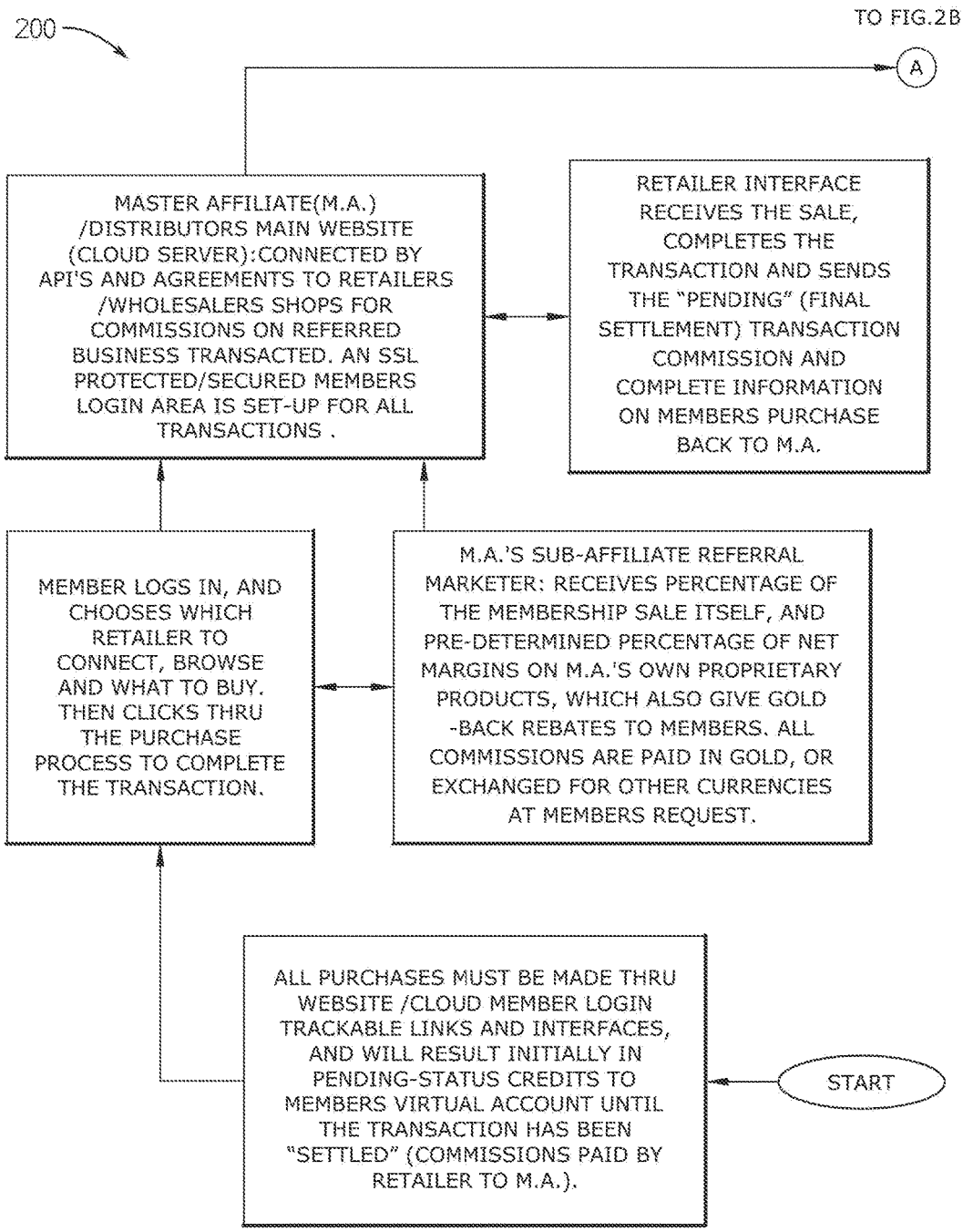
FIG. 2A illustrates a detailed process for providing physical gold-back rebates on purchases via a secured gold-back savings system in some embodiments.
Figure 2B:
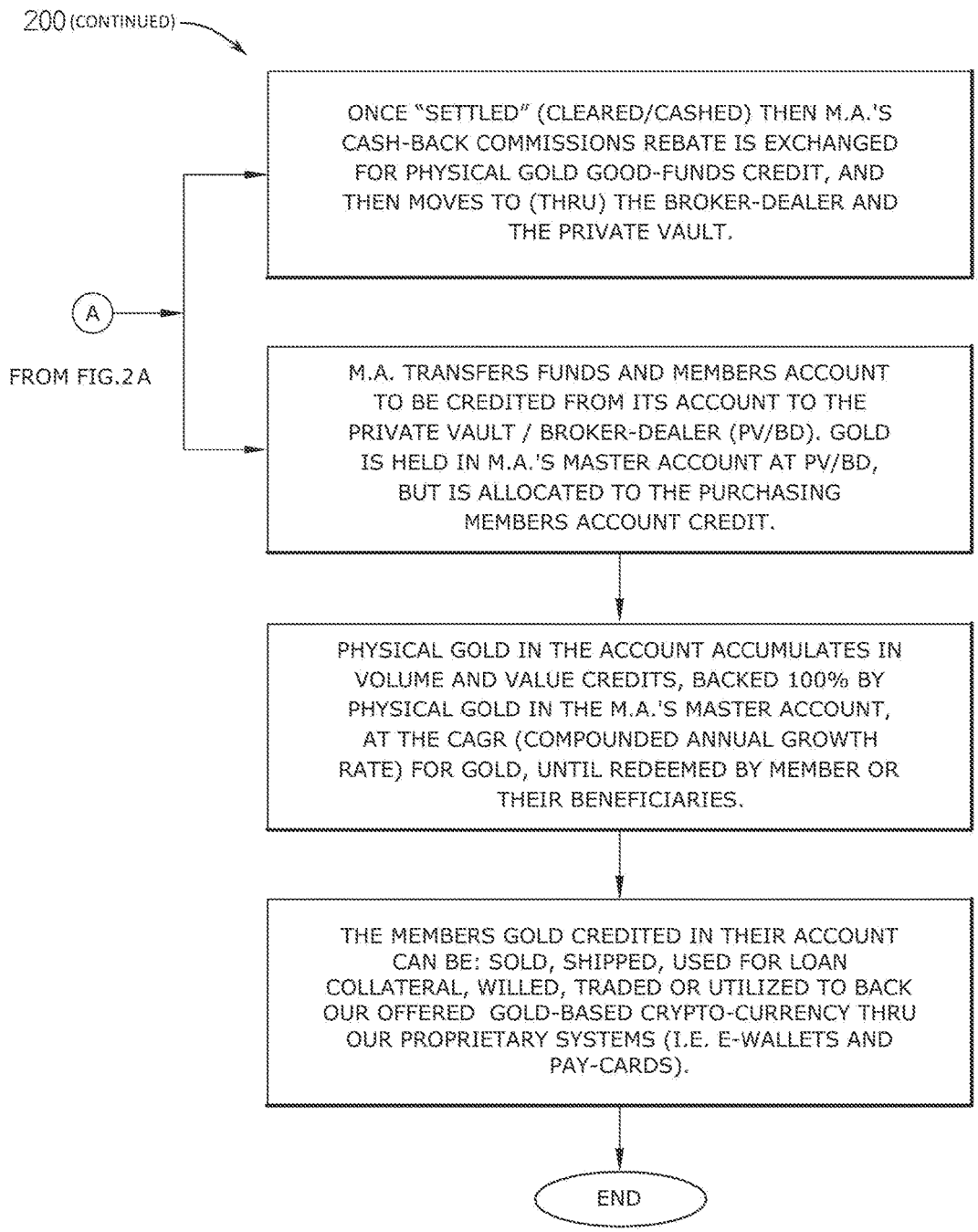
FIG. 2B is a continuation of the detailed process in FIG. 2A.

Turning to another example, FIGS. 2A and 2B illustrate a detailed process 200 for providing physical gold-back rebates on purchases via a secured gold-back savings system. The detailed process 200 may be comprised of the steps illustrated in these figures, to allow a secure and viable channel for a person to purchase products or services, in which individual member persons or entities would purchase products or services through affiliated retailers and wholesalers. The purchases would be made over protected and secured links in the member's login area. The member simply searches for products or services, and for the best pricing and rebate offers on each item, and thereafter makes the purchase(s) like any other typical e-commerce or POS purchase transaction.

The following items may allow a person to quickly build and deploy a secured SSL protected private membership savings club platform that provides a secure and viable channel for individual members to purchase products and services:

1. Primary entity signs up as a master affiliate or distributor for retail and wholesale products and services online (i.e., e-commerce purchases) and at the POS outlets (i.e., point-of-sale purchases at physical "Brick-n-Mortar" locations/stores).

2. Application programming interface (API) are integrated for tracking of all sources, status and aspects (credits) of all purchases by a person, who is a registered member purchaser with a virtual "account" for tracking purchases, for affiliate commissions to the primary entity made through its links/cards/e-wallets/mobile applications, auspices, and systems.

3. Once settlement of transaction occurs (i.e., no chargebacks, returns, refunds, etc.) and commissions paid to the primary entity, then firm full credit is given to the member purchaser's virtual account, end of pending status to profit/pay-out/pay-back status.

4. Now the fiat cash commission rebate paid to the primary entity (un-backed by any commodity with intrinsic value government currencies such as USD) is exchanged (FX trade) for pure physical gold through a proven non-bank broker dealer and private vault.

5. The non-bank precious metals private vaults/brokers are not designated as "financial institutions", so are not regulated or governed by FATCA (i.e., Foreign Account Tax Compliance Act), or US Banking Acts, can and do fully insure and account for all physical gold purchases held. These rebates on purchases are deemed non-taxable by the IRS, and other court rulings justify the non-reportable status, and freedom to hold in several domestic or international jurisdictions, without retention, confiscation, or penalty for diversification of assets allocation.

6. These holdings accumulate in volume and value without taxation from income tax or the hidden inflation tax. Not subject to capital gains being rebated purchases proceeds.

Also, e-commerce purchases through specific e-wallets or any online transactions or mobile apps, reward cards, POS purchases, etc., can be included in the auspices of the platform. Crypto-currencies backed by precious metals accounts funded by purchase rebates and other contributions. Also, the platform can be adapted for use in gold and silver backed bank/vaults that are full-reserve not fractional reserve, gold-backed insurances/pensions, gold rebate tax collections security accounts, gold rebate leases/rentals, as well as all other purchases of services and products.

In this specification, the term "software" is meant to include applications stored in magnetic storage, which can be read into memory for processing by a processor. In some embodiments, the software, when installed to operate on one or more electronic systems, define one or more specific machine implementations that execute and perform the operations of the software. In particular, the processes described above may be implemented as software processes that are specified as a set of instructions recorded on a computer readable storage medium (also referred to as a non-transitory computer readable medium). When these instructions are executed by one or more processing unit(s), they cause the processing unit(s) to perform the actions indicated in the instructions. Examples of computer readable media include, but are not limited to, CD-ROMs, flash drives, RAM chips, hard drives, EPROMs, EEPROMs, etc. The computer readable media does not include carrier waves and electronic signals passing wirelessly or over wired connections.

Figure 3:
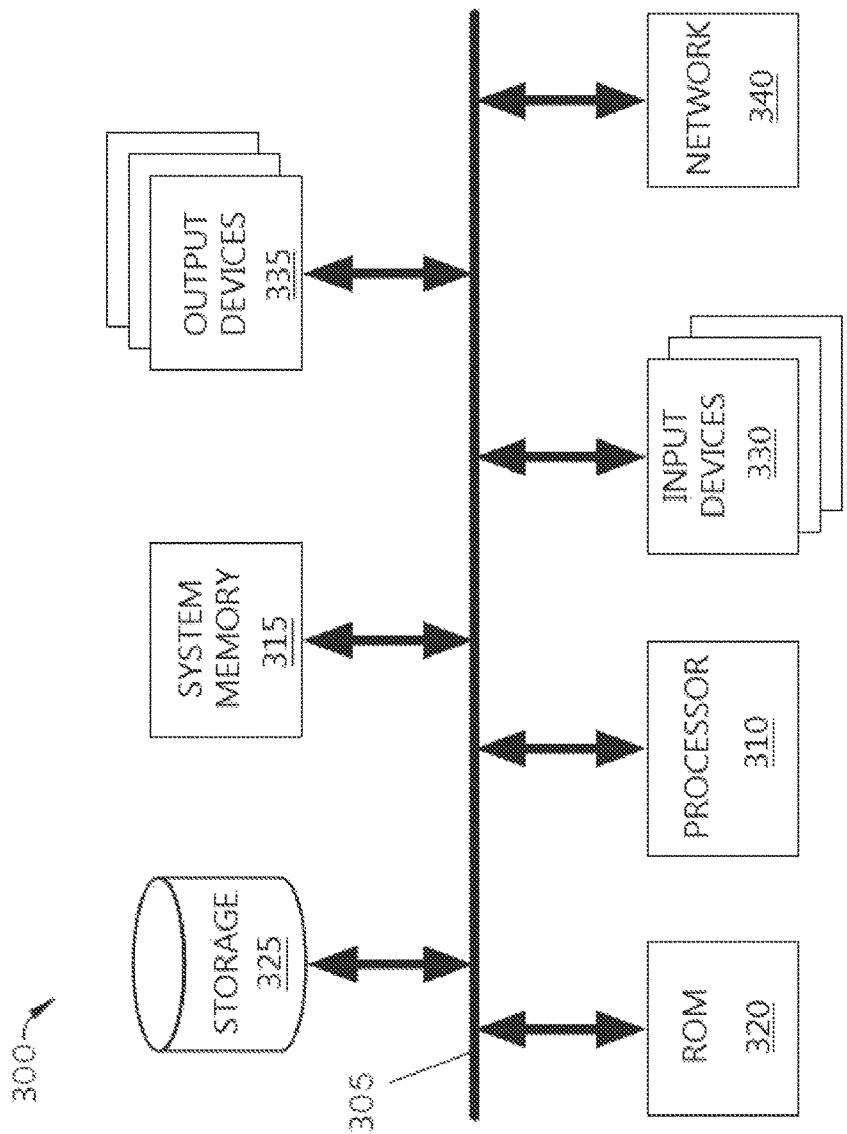
FIG. 3 illustrates an electronic system with which some embodiments of the invention are implemented.

FIG. 3 illustrates an electronic system 300. The electronic system 300 may be any computing device, such as a desktop or laptop computer, a tablet, a smart phone, or any other sort of electronic device. Such an electronic system includes various types of computer readable media and interfaces for various other types of computer readable media. Electronic system 300 includes a bus 305, processing unit(s) 310, a system memory 315, a read-only 320, a permanent storage device 325, input devices 330, output devices 335, and a network 340.

The above-described embodiments of the invention are presented for purposes of illustration and not of limitation. Thus, the invention is not to be limited by the foregoing illustrative details, but rather is to be defined by the appended claims.

I claim:

1. A process for providing physical gold-back rebates on purchases, said process comprising:

connecting, by a computing device of a member purchaser, to a secured SSL protected private membership savings club platform that is hosted on secure server computer;

presenting, by the secure server computer, a member login website to the computing device of the member purchaser via the secured SSL protected private membership savings club platform;

logging in, by the member purchaser inputting user credentials into the computing device and the computing device transmitting the user credentials to the secure server computer for user validation, to the member login website;

presenting a member purchase area in connection with a virtual account associated with the member purchaser, wherein the virtual account tracks source and status of each purchase the member purchaser makes through a corresponding trackable link that uniquely identifies a provider comprising one of an affiliate, a distributor, and a value-added reseller offering a purchase commission rebate from a primary entity comprising one of a retailer, a wholesaler, and a service provider;

purchasing, by the member purchaser interacting with the computing device in the member purchase area by way of the secure server computer that hosts the secured SSL protected private membership savings club platform, a product through a particular trackable link associated with a particular provider;

settling a purchase transaction for the purchase of the product, by the member purchaser interacting, in the member purchase area, with the secured SSL protected private membership savings club platform through the computing device and by way of the secure server computer, with funds designated by the member purchaser to pay for the purchase;

tracking, by the virtual account, source and status of the purchase transaction in the member purchase area associated with the member purchaser based on the particular trackable link associated with the particular provider;

transferring a portion of the funds to a gold broker in exchange for an amount of gold;

crediting the amount of gold to a gold deposit area of the member purchase area;

depositing the amount of gold into a private vault associated with the member purchaser;

allocating the amount of gold deposited into the private vault to the member purchaser;

updating a status of the deposited amount of gold in the gold deposit area of the member purchase area; and presenting, in the gold deposit area of the member purchase area, the status of the deposited amount of gold in the private vault in connection with the purchase transaction completed via the secured SSL protected private membership savings club platform.

2. The process of claim 1, wherein the member login website comprises an SSL member login area, wherein the member purchaser logs in to the virtual account through the SSL member login area of the secured SSL protected private membership savings club platform.

3. The process of claim 1, wherein the particular trackable link is a web link from a primary entity website to one of a retailer and a wholesaler.

4. The process of claim 1, wherein the purchase transaction is settled by one of a credit card account of the member purchaser, a debit card account of the member purchaser, and a funds transfer from an account of the member purchaser at a financial institution.

5. The process of claim 1, wherein settling the purchase transaction comprises providing an affiliate commission to the provider.

6. The process of claim 1, wherein settling the purchase transaction comprises providing a primary commission to the primary entity.

7. The process of claim 6, wherein providing the primary commission to the primary entity comprises exchanging the primary commission for physical gold at a current spot price for gold.

8. The process of claim 1 further comprising:
setting, in the gold deposit area of the member purchase area, a status associated with the virtual account of the member purchaser to pending status before allocating the gold amount to the member purchaser, wherein said pending status corresponds to a credit amount equal to the amount of gold;
receiving the amount of gold at the primary entity; and
allocating the received amount of gold for the member purchaser.

9. The process of claim 1 further comprising allowing the deposited amount of gold to be used by the member purchaser in any way the member purchaser sees fit.

10. The process of claim 9, wherein allowing the deposited amount of gold to be used by the member purchaser comprises saving the deposited amount of gold to build and compound value of the gold.

* * * * *